US009142826B1

(12) United States Patent
Wang et al.

(10) Patent No.: US 9,142,826 B1
(45) Date of Patent: Sep. 22, 2015

(54) BATTERY PACK (71) Applicant: Samsung SDI Co., Ltd., Yongin-si, Gyeonggi-do (KR)

(72) Inventors: Hanjun Wang, Yongin-si (KR); Daeyon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/477,766

(22) Filed: Sep. 4, 2014

(30) Foreign Application Priority Data

Jun. 12, 2014 (KR) .................. 10-2014-0071491

(51) Int. Cl.
*H01M 2/02* (2006.01)
*H01M 2/34* (2006.01)
*H01M 2/10* (2006.01)
*H01M 10/052* (2010.01)

(52) U.S. Cl.
CPC ............. *H01M 2/34* (2013.01); *H01M 2/0202* (2013.01); *H01M 2/1022* (2013.01); *H01M 10/052* (2013.01); *H01M 2200/00* (2013.01); *H01M 2220/30* (2013.01)

(58) Field of Classification Search
None
See application file for complete search history.

(56) References Cited

U.S. PATENT DOCUMENTS

| 2005/0100783 | A1 | 5/2005 | Ro et al. |
| 2006/0091891 | A1 | 5/2006 | Woo et al. |
| 2009/0258285 | A1 | 10/2009 | Kim |
| 2009/0305119 | A1* | 12/2009 | Kim ................................ 429/93 |
| 2011/0008667 | A1* | 1/2011 | Kwag et al. .................... 429/123 |
| 2012/0282516 | A1* | 11/2012 | Kim .............................. 429/159 |
| 2014/0044995 | A1 | 2/2014 | Moon et al. |
| 2014/0050968 | A1 | 2/2014 | Park |

FOREIGN PATENT DOCUMENTS

| KR | 10-2005-0036751 A | 4/2005 |
| KR | 10-2006-0039377 A | 5/2006 |
| KR | 10-2009-0108417 A | 10/2009 |
| KR | 20-2011-0007761 U | 8/2011 |
| KR | 10-2014-0021468 A | 2/2014 |
| KR | 10-2014-0024156 A | 2/2014 |
| KR | 10-1364096 B1 | 2/2014 |

OTHER PUBLICATIONS

Korean Notice of Allowance dated Dec. 29, 2014 for Korean Patent Application No. KR 10-2014-0071491 which corresponds to captioned U.S. Appl. No. 14/477,766.

* cited by examiner

*Primary Examiner* — Patrick Ryan
*Assistant Examiner* — Haixia Zhang
(74) *Attorney, Agent, or Firm* — Knobbe Martens Olson & Bear LLP (57) ABSTRACT A battery pack is disclosed. In one aspect, a battery pack includes a plurality of battery units arranged in a first direction, each battery unit including first and second side surfaces opposing each other and a third side surface crossing the first and second side surfaces. The battery pack also includes a lower cover placed on the third side surfaces, wherein the lower cover includes a bottom plate facing the third side surfaces, a plurality of first ribs extending from the bottom plate toward the first side surfaces, and a plurality of second ribs extending from the bottom plate toward the second side surfaces and separate from each other, wherein the first rib extends in the first direction so as to at least partially cover the first side surfaces.

11 Claims, 6 Drawing Sheets

BATTERY PACK

INCORPORATION BY REFERENCE TO ANY PRIORITY APPLICATIONS

This application claims the benefit of Korean Patent Application No. 10-2014-0071491, filed on Jun. 12, 2014, in the Korean Intellectual Property Office, the disclosure of which is incorporated herein in its entirety by reference.

BACKGROUND

1. Field

The described technology generally relates to a battery pack.

2. Description of the Related Technology

With the advent of wireless Internet and communication technology, the use of portable computing devices equipped with batteries has become ubiquitous. These devices are small, easy to carry, and optimized for mobility, and thus, widely used for business and personal use. Portable devices including battery packs can be used anywhere without being limited to places where power outlets are available. These battery packs typically include multiple rechargeable battery units to deliver sufficient output power.

SUMMARY OF CERTAIN INVENTIVE ASPECTS

One inventive aspect is a battery pack.

Another aspect is a battery pack that includes: a plurality of battery units arranged side by side in a first direction, each of the plurality of battery units having a first side surface exposed in a second direction perpendicular to the first direction and a second side surface exposed in a third direction opposite to the second direction; a protective circuit module electrically connected to the plurality of battery units; an upper cover disposed on upper sides of the plurality of battery units; and a lower cover disposed on lower sides of the plurality of battery units, wherein the lower cover includes: a bottom plate facing bottom surfaces of the plurality of battery units; first ribs extending from the bottom plate toward the first side surfaces of the plurality of battery units and separate from each other; and second ribs extending from the bottom plate toward the second side surfaces of the plurality of battery units and separate from each other, wherein each of the first ribs extends in the first direction to cover first side surfaces of neighboring battery units of the plurality of battery units.

Each of the second ribs can face each of the first ribs in such a manner that each of the second ribs can overlap at least a portion of the first ribs.

The first and second ribs can be asymmetrically arranged with reference to a centerline axis of the bottom plate defined in the first direction.

The second ribs can be disposed to correspond to the second side surfaces of the plurality of battery units, respectively.

The second ribs can respectively cover only the second side surfaces of the plurality of battery units.

Each of the plurality of battery units can have a prismatic shape.

Each of the plurality of battery units can include: a can including an opening; an electrode assembly accommodated in the can, the electrode assembly including a first electrode plate, a second electrode plate, and a separator disposed between the first and second electrode plates; a cap plate sealing the opening of the case; and an electrode pin disposed on the cap plate and having a polarity different from a polarity of the cap plate.

The protective circuit module can be disposed between the upper cover and the upper sides of the plurality of battery units.

The plurality of battery units can be connected in series, parallel, or series-parallel through a circuit pattern formed in the protective circuit module.

Another aspect is a battery pack that includes: a first battery unit and a second battery unit arranged in a direction such that first side surfaces of the first and second battery units are exposed in the same direction; a protective circuit module electrically connected to the first and second battery units; an upper cover disposed on upper sides of the first and second battery units; and a lower cover disposed on lower sides of the first and second battery units, wherein the lower cover includes: a bottom plate facing bottom surfaces of the first and second battery units; a first sub-rib disposed on a first side of the bottom plate, the first sub-rib covering both the first side surfaces of the first and second battery units; and a second sub-rib disposed on a second side of the bottom plate parallel to the first side of the bottom plate, the second sub-rib facing the first sub-rib in such a manner that at least a portion of the second sub-rib overlaps the first sub-rib.

The lower cover can further include a fourth sub-rib disposed on the second side of the bottom plate and separate from the second sub-rib.

The second sub-rib can cover a second side surface of the first battery unit opposite to the first side surface of the first battery unit.

The fourth sub-rib can cover a second side surface of the second battery unit opposite to the first side surface of the second battery unit.

Each of the first and second battery units can include: a can including an opening; an electrode assembly accommodated in the can through the opening, the electrode assembly including a first electrode plate having a first polarity, a second electrode plate having a second polarity, and a separator disposed between the first and second electrode plates; a cap plate sealing the opening of the case; and an electrode pin extending upward from the cap plate.

The cap plate can have the first polarity, and the electrode pin can have the second polarity.

The protective circuit module can be disposed between the upper cover and the upper sides of the first and second battery units.

The first and second battery units can be connected in series, parallel, or series-parallel through a circuit pattern formed in the protective circuit module.

Another aspect is a battery pack comprising a plurality of battery units arranged in a first direction, each battery unit including first and second side surfaces opposing each other. The battery pack also comprises a protective circuit module electrically connected to the battery units and an upper cover and a lower cover respectively placed on upper sides and lower sides of the battery units. The lower cover comprises a bottom plate facing bottom surfaces of the battery units, a plurality of first ribs extending from the bottom plate toward the first side surfaces and separate from each other, and a plurality of second ribs extending from the bottom plate toward the second side surfaces and separate from each other, wherein each first rib extends in the first direction so as to at least partially cover the first side surfaces of neighboring battery units.

In the above battery pack, each second rib overlaps at least a portion of at least one of the first ribs.

In the above battery pack, the first and second ribs are asymmetrically arranged with reference to a centerline axis of the bottom plate defined in the first direction.

In the above battery pack, the second ribs are placed so as to respectively correspond to the second side surfaces. In the above battery pack, the second ribs at least partially cover only the respective second side surface.

In the above battery pack, each battery unit has a substantially prismatic shape. In the above battery pack, each battery unit comprises a can and an electrode assembly accommodated in the can and comprising a first electrode plate, a second electrode plate, and a separator placed therebetween. In the above battery pack, each battery unit also comprises a cap plate sealing the electrode assembly in the can and an electrode pin placed on the cap plate and having a polarity different from the polarity of the cap plate.

In the above battery pack, the protective circuit module is placed between the upper cover and the upper sides of the battery units.

In the above battery pack, the battery units are electrically connected in series, parallel, or series-parallel through a circuit pattern formed in the protective circuit module.

Another aspect is a battery pack comprising first and second battery units arranged in a direction such that first side surfaces of the first and second battery units are substantially parallel to each other, a protective circuit module electrically connected to the first and second battery units, an upper cover placed on upper sides of the first and second battery units, and a lower cover placed on lower sides of the first and second battery units. The lower cover comprises a bottom plate facing bottom surfaces of the first and second battery units, a first sub-rib placed on a first side of the bottom plate, the first sub-rib at least partially covering both the first side surfaces, and a second sub-rib placed on a second side of the bottom plate substantially parallel to the first side, wherein at least a portion of the second sub-rib overlaps the first sub-rib.

In the above battery pack, the lower cover further comprises a third sub-rib placed on the first side of the bottom plate and separate from the first sub-rib and a fourth sub-rib placed on the second side of the bottom plate and separate from the second sub-rib.

In the above battery pack, the second sub-rib at least partially covers a second side surface of the first battery unit opposite to the first side surfaces.

In the above battery pack, the fourth sub-rib at least partially covers a second side surface of the second battery unit opposite to the first side surface of the second battery unit.

In the above battery pack, each of the first and second battery units comprises a can and an electrode assembly accommodated in the can and comprising a first electrode plate having a first polarity, a second electrode plate having a second polarity, and a separator placed therebetween. In the above battery pack, each of the first and second battery units also comprises a cap plate sealing the electrode assembly in the can and an electrode pin extending upward from the cap plate.

In the above battery pack, the cap plate has the first polarity, wherein the electrode pin has the second polarity different from the first polarity.

In the above battery pack, the protective circuit module is placed between the upper cover and the upper sides of the first and second battery units.

In the above battery pack, the first and second battery units are electrically connected in series, parallel, or series-parallel through a circuit pattern formed in the protective circuit module.

Another aspect is a battery pack comprising a plurality of battery units arranged in a first direction, each battery unit including i) first and second side surfaces opposing each other and ii) a third side surface crossing the first and second side surfaces. The battery pack also comprises a lower cover placed on the third side surfaces, wherein the lower cover comprises a bottom plate facing the third side surfaces, a plurality of first ribs extending from the bottom plate toward the first side surfaces, and a plurality of second ribs extending from the bottom plate toward the second side surfaces and separate from each other, wherein the first rib extends in the first direction so as to at least partially cover the first side surfaces.

In the above battery pack, each second rib at least partially overlaps at least one of the first ribs.

In the above battery pack, the first and second ribs are asymmetrically arranged with reference to a centerline axis of the bottom plate defined in the first direction.

DETAILED DESCRIPTION OF CERTAIN INVENTIVE EMBODIMENTS

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments can have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

In the following descriptions of the embodiments, although the terms "first and second" are used to describe various elements, these elements should not be limited by these terms. These terms are only used to distinguish one element from another element.

In the following descriptions of the embodiments, the terms of a singular form can include plural forms unless referred to the contrary.

In the following descriptions of the embodiments, the meaning of "include," "comprise," "including," or "comprising," specifies a property, a region, a fixed number, a step, a process, an element, a component, and a combination thereof but does not exclude other properties, regions, fixed numbers, steps, processes, elements, components, and combinations thereof.

It will be understood that when a film, a region, or an element is referred to as being "above" or "on" another film, region, or element, it can be directly on the other film, region, or element, or intervening films, regions, or elements can also be present.

In the drawings, the sizes of elements can be exaggerated for clarity. For example, in the drawings, the size or thickness of each element can be arbitrarily shown for illustrative purposes, and thus the described technology should not be construed as being limited thereto. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 1:
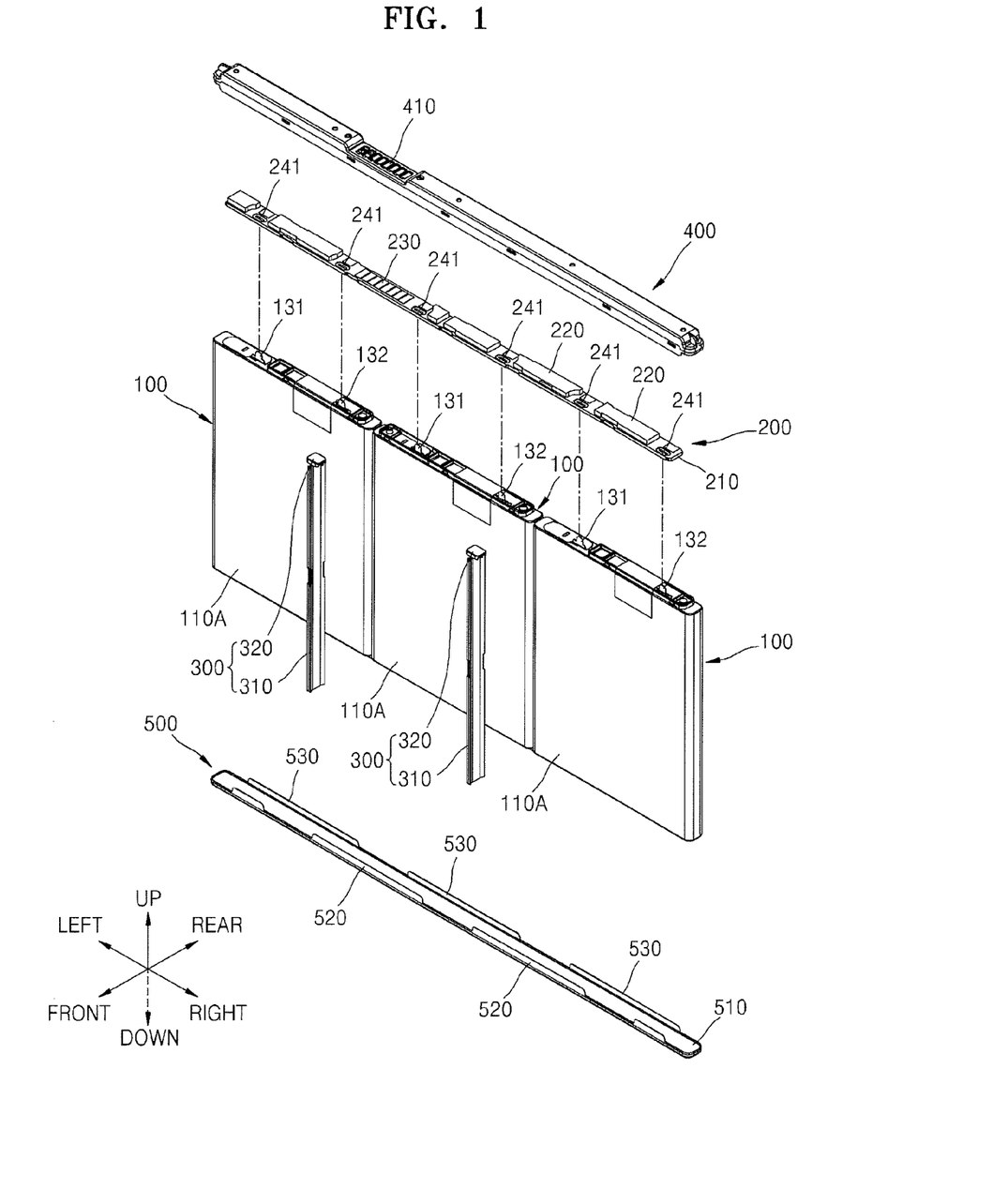
FIG. 1 is an exploded perspective view illustrating a battery pack according to an embodiment.
Figure 2:
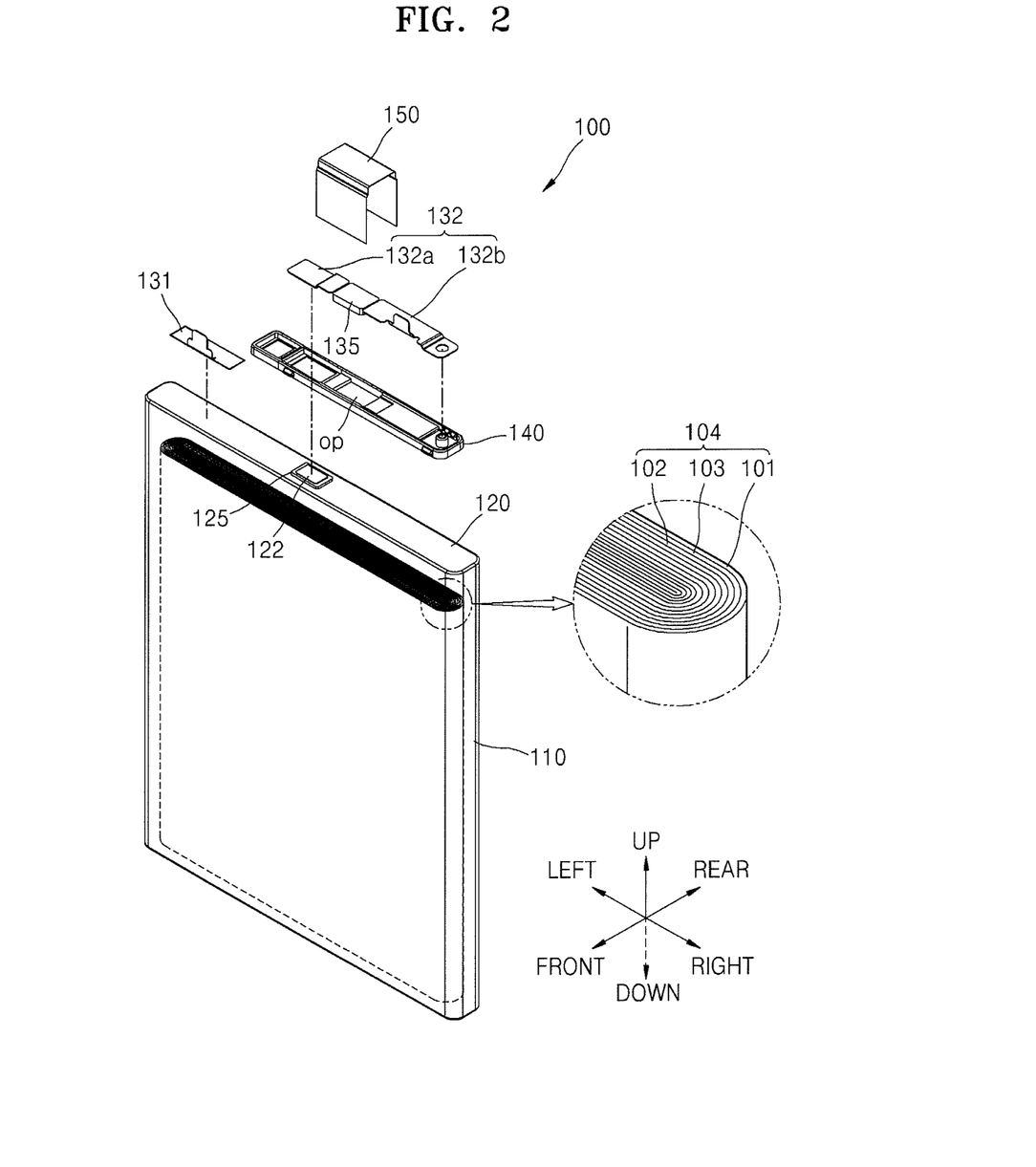
FIG. 2 is an exploded perspective view illustrating a battery unit according to an embodiment.

FIG. 1 is an exploded perspective view illustrating a battery pack according to an embodiment. FIG. 2 is an exploded perspective view illustrating a battery unit according to an embodiment.

Referring to FIG. 1, the battery pack includes a plurality of battery units 100, a protective circuit module 200, spacers 300, an upper cover 400, and a lower cover 500.

The battery units 100 are arranged side by side in a first direction (left-to-right direction). First side surfaces 110A of the battery units 100 are exposed toward the front side of the battery pack, and second side surfaces 110B (refer to FIG. 6) of the battery units 100 opposite to the first side surfaces 110A are exposed toward the back side of the battery pack. The neighboring battery units 100 can be arranged such that third and fourth side surfaces of the battery units 100 substantially perpendicular to the first and second side surfaces 110A and 110B face each other. The battery units 100 can be rechargeable secondary battery cells such as lithium-ion battery cells. However, the battery units 100 are not limited thereto.

The battery units 100 have a prismatic shape. Referring to FIG. 2, each of the battery units 100 includes a can 110 having an opening, an electrode assembly 104 placed in the can 110 through the opening, a cap plate 120 sealing the opening of the can 110, an electrode pin 122 formed on the cap plate 120, a holder 140 placed on the cap plate 120, and first and second electrode tabs 131 and 132.

The can 110 can have a substantially hexahedral shape with an opened top side and can be formed of a metallic material so as to provide sufficient strength. For example, the can 110 can be formed of aluminum or an aluminum alloy. After the electrode assembly 104 is inserted into the can 110, the opening of the can 110 can be substantially hermetically sealed by the cap plate 120. Like the can 110, the cap plate 120 can be formed of a metallic material such as aluminum or an aluminum alloy. Boundaries between the cap plate 120 and the can 110 can be joined by a method such as a laser welding method for sealing the inside of the can 110.

The electrode assembly 104 can include a first electrode plate 101, a second electrode plate 102, and a separator 103 placed between the first and second electrode plates 101 and 102. The first and second electrode plates 101 and 102 have different polarities. The electrode assembly 104 can be formed by sequentially stacking the first electrode plate 101, the separator 103, and the second electrode plate 102, and winding them in the form of a jelly roll.

In the present embodiment, the electrode assembly 104 has a jelly roll shape. However, the embodiments are not limited thereto. For example, in other embodiments, the electrode assembly 104 can be a stack in which the first electrode plate 101, the separator 103, and the second electrode plate 102 are sequentially stacked.

The electrode pin 122 is formed on the cap plate 120. The first electrode plate 101 can be electrically connected to the cap plate 120, and the second electrode plate 102 can be electrically connected to the electrode pin 122. Since the first and second electrode plates 101 and 102 have different polarities, the electrode pin 122 and the cap plate 120 have different polarities. For example, the electrode pin 122 has a negative polarity, and the cap plate 120 has a positive polarity. A gasket 125 can be placed between the electrode pin 122 and the cap plate 120 so as to prevent a short circuit therebetween. For example, the gasket 125 is formed of an insulation material for preventing a short circuit between the electrode pin 122 and the cap plate 120.

Each battery unit 100 can include the first and second electrode tabs 131 and 132. The first and second electrode tabs 131 and 132 can respectively function as a positive terminal and a negative terminal of a secondary battery.

For example, the first electrode tab 131 can be placed on the cap plate 120 and electrically connected to the cap plate 120, for example, by welding. If the cap plate 120 has a positive polarity, the first electrode tab 131 welded on the cap plate 120 also has a positive polarity.

The second electrode tab 132 can be electrically connected to the electrode pin 122 and a temperature device 135 such as a temperature cutoff (TCO) device. For example, the second electrode tab 132 can include a first part 132a and a second part 132b. An end of the first part 132a can be connected to the electrode pin 122, and the other end of the first part 132a can be connected to the temperature device 135. In addition, an end of the second part 132b can be connected to the temperature device 135. In this manner, the second electrode tab 132 can be electrically connected to the temperature device 135 and the electrode pin 122.

The first and second electrode tabs 131 and 132 can be placed on the cap plate 120. For example, the first electrode tab 131 is placed in a first region of the cap plate 120, and the second electrode tab 132 is placed in a second region of the cap plate 120. The sum of the areas of the first and second electrode tabs 131 and 132 facing the cap plate 120 can be smaller than an upper surface area of the cap plate 120 so that the first and second electrode tabs 131 and 132 do not protrude from the upper surface area of the cap plate 120 in a left, right, forward, or backward direction.

Since the cap plate 120 has a positive polarity, the second electrode tab 132 having a negative polarity can be short-circuited with the cap plate 120. Therefore, the second electrode tab 132 can be placed on the holder 140 placed on the cap plate 120.

The holder 140 can accommodate the second electrode tab 132 and the temperature device 135. The holder 140 can include an opening OP at a position corresponding to the position of the temperature device 135 so that the temperature device 135 can operate based on the temperature of the battery unit 100. The holder 140 can be fixed to the battery unit 100 by using a fixing material such as a piece of tape 150.

Referring back to FIG. 1, the protective circuit module 200 can be placed on and electrically connected to the battery units 100 so as to control charging and discharging operations of the battery units 100 and prevent overheating and explosion caused by overcharging, overdischarging, or an overcurrent.

The protective circuit module 200 can have a circuit board 210, protection devices 220 placed on the circuit board 210, and external terminals 230. The circuit board 210 can extend in the first direction. The protection devices 220 can include integrated circuits, or safety devices including passive elements such as resistors and condensers or active elements such as transistors.

The circuit board 210 can have connection holes 241 defined therein. The first and second electrode tabs 131 and 132 can be inserted into the connection holes 241 and soldered to the circuit board 210.

The circuit board 210 can include a pattern through which the battery units 100 are electrically connected in series and/or parallel. Therefore, since the first and second electrode tabs 131 and 132 are connected to the circuit board 210 through the connection holes 241, charging and discharging of the battery units 100 can be controlled by operations of the protection devices 220, and the battery units 100 can be electrically connected in series and/or parallel.

The spacers 300 are placed between the neighboring battery units 100, and ends of the spacers 300 can extend toward the protective circuit module 200 so as to support the protective circuit module 200. For example, the spacers 300 include first parts 310 placed between the neighboring battery units 100, and second parts 320 extending from the first parts 310 toward the protective circuit module 200.

The first parts 310 can electrically insulate the battery units 100 from each other. As described with reference to FIG. 2, the cans 110 and the cap plates 120 can be formed of metal, and the cans 110 and the cap plates 120 can be welded together. Thus, the cans 110 and the cap plates 120 can have the same polarity. If the battery units 100 are arranged side by side as shown in FIG. 1, unnecessary electric connections can be made between the battery units 100. The first parts 310 can prevent unnecessary connections between the battery units 100.

The second parts 320 can be placed in a space (gap) between the protective circuit module 200 and the battery units 100 and can support the protective circuit module 200. The battery units 100 include the electrode pins 122 protruding upward, and the holders 140 can be placed on the battery units 100. Thus, the space can be formed between upper surfaces of the battery units 100 and a lower surface of the protective circuit module 200. Therefore, the second parts 320 can be placed in the space so as to support the protective circuit module 200 and protect the protective circuit module 200.

The upper cover 400 can be placed on the protective circuit module 200. The upper cover 400 can include openings 410 so as to expose the external terminals 230.

The upper cover 400 can have substantially the same length as the total length of the battery units 100 arranged side by side in the first direction. The upper cover 400 can cover the upper sides of the battery units 100 in a state where the protective circuit module 200 is placed therebetween.

The lower cover 500 can be placed at a side opposite the upper cover 400. The lower cover 500 can have substantially the same length as the total length of the battery units 100 arranged side by side in the first direction. The lower cover 500 can cover lower surfaces of the battery units 100.

The lower cover 500 can include a bottom plate 510 and first and second ribs 520 and 530 extending upward from the bottom plate 510.

The lower cover 500 can face the lower surfaces of the battery units 100 and can have substantially the same length as the total length of the battery units 100 arranged side by side in the first direction.

The first ribs 520 can be arranged along a first side of the bottom plate 510 and can be separated from each other. The second ribs 530 can be arranged along a second side of the bottom plate 510 substantially parallel to the first side and can be separated from each other.

The lower cover 500 can be manufactured through an injection molding process by injecting a high-temperature resin into a mold. In another example, the first and second ribs 520 and 530 are not separated from each other but can be continuous. That is, the first and second ribs 520 and 530 can enclose edges of the bottom plate 510. In this case, however, it can be difficult to manufacture the lower cover 500.

In a manufacturing process, when the lower cover 500 is separated from a mold, gas generated during the formation of the lower cover 500 is discharged. In this case, if the first and second ribs 520 and 530 are continuously formed to enclose the edges of the bottom plate 510, it can be difficult to discharge the generated gas, and thus, the lower cover 500 can be deformed by the gas.

However, according to some embodiments, the first and second ribs 520 and 530 are separated from each other. Therefore, the generated gas can be easily discharged through gaps between adjacent ribs 520 and/or 530.

The first and second ribs 520 and 530 can be separated from each other by a distance corresponding to the width of the bottom plate 510 and can be arranged substantially parallel to each other. Positions of the battery units 100 can be fixed relative to each other by the first and second ribs 520 and 530. The first ribs 520 can extend toward the first side surfaces 110A, and the second ribs 530 can extend toward the second side surfaces 110B.

Figure 3:
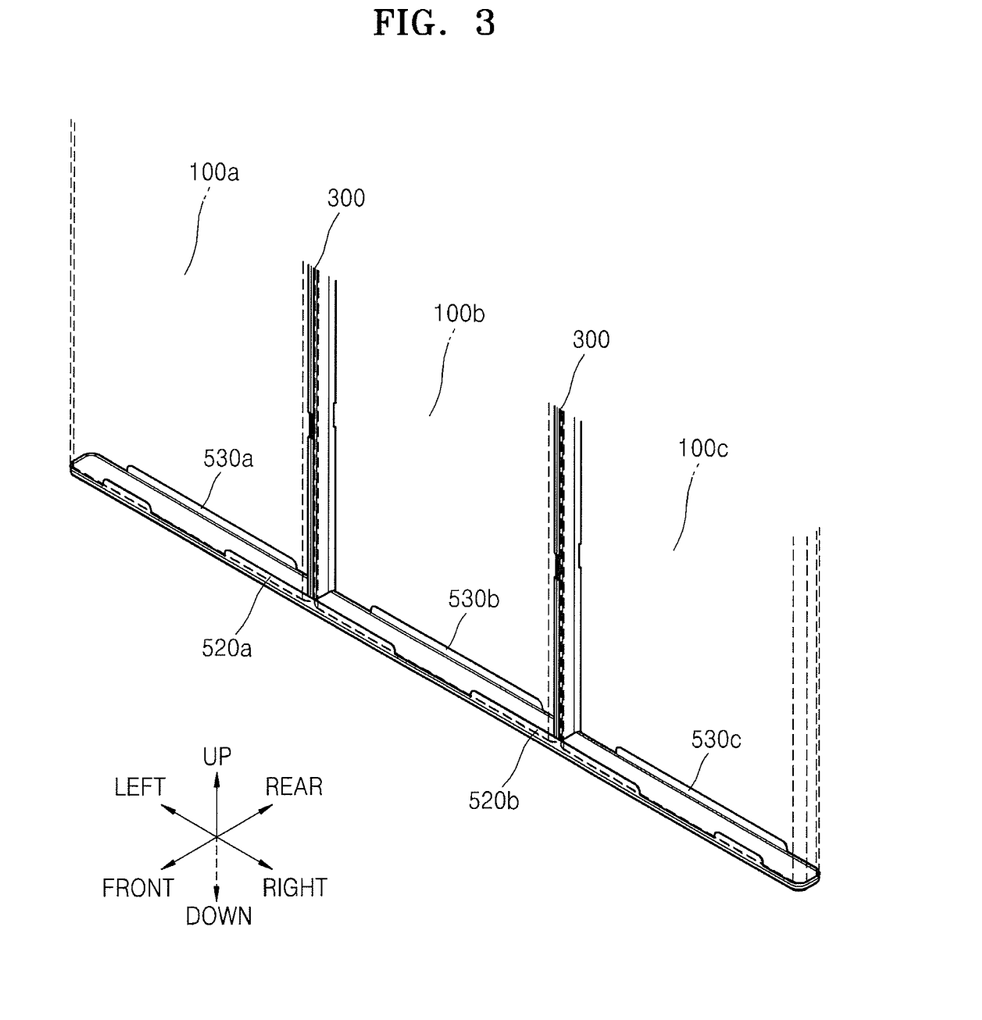
FIG. 3 is a perspective view illustrating a lower cover and dashed outlines of a plurality of battery units according to an embodiment.
Figure 4:
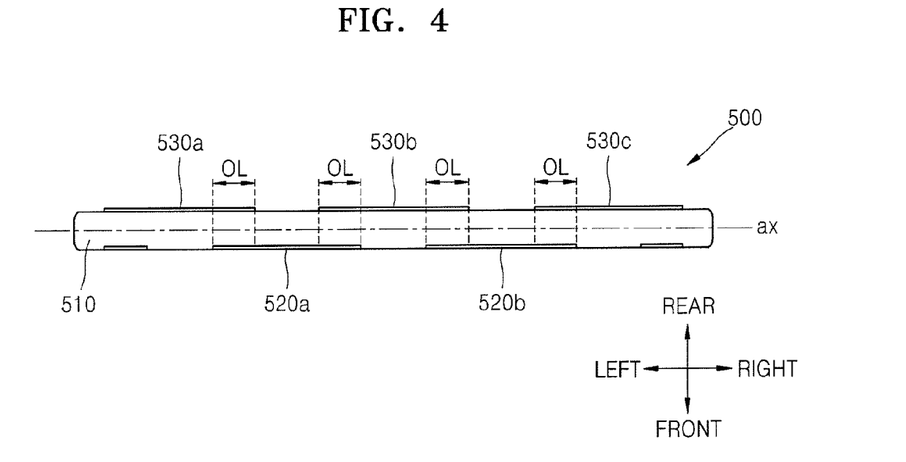
FIG. 4 is a plan view illustrating an upper side of the lower cover of the battery pack according to an embodiment.
Figure 5:
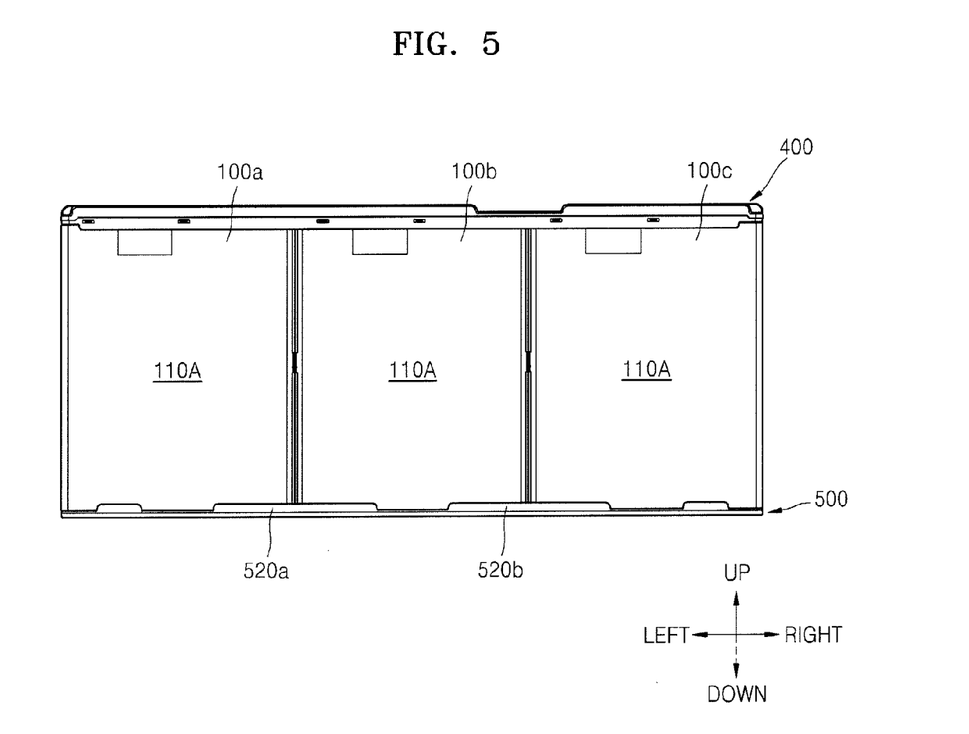
FIG. 5 is a front view illustrating the battery pack according to an embodiment.
Figure 6:
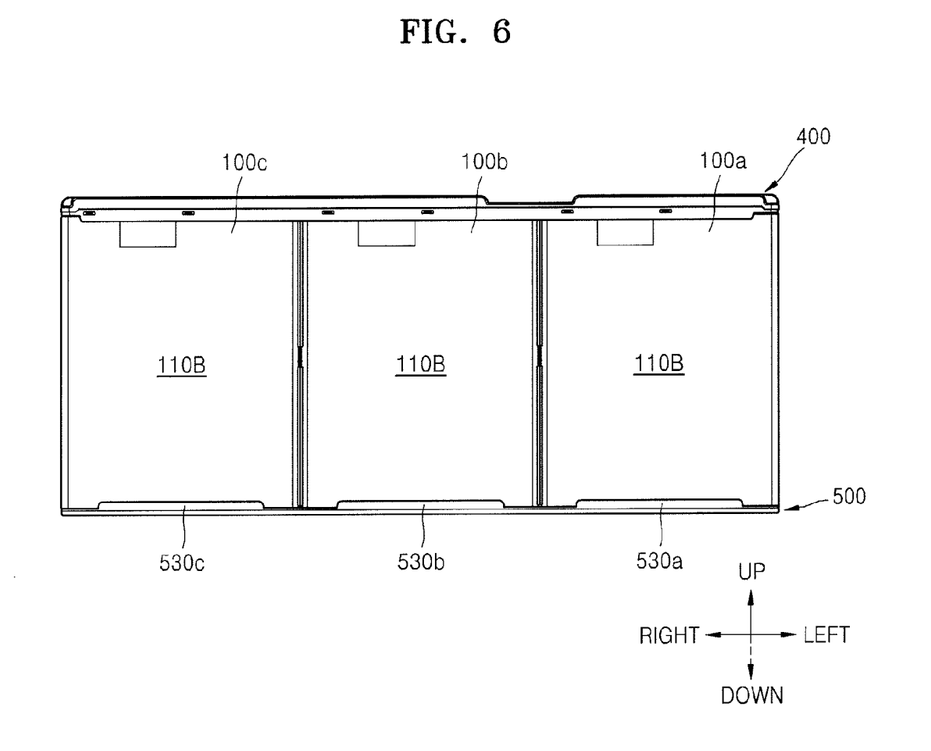
FIG. 6 is a rear view illustrating the battery pack according to an embodiment.

FIG. 3 is a perspective view illustrating a lower side of the battery pack according to an embodiment. FIG. 4 is a plan view illustrating an upper side of the lower cover 500 according to an embodiment. FIG. 5 is a front view illustrating the battery pack according to an embodiment. FIG. 6 is a rear view illustrating the battery pack according to an embodiment.

In the following description, it is assumed for clarity that the battery units 100 include first to third battery units 100a, 110b, and 110c. The first ribs 520 include a first sub-rib 520a and a third sub-rib 520b. The second ribs 530 include a second sub-rib 530a, a fourth sub-rib 530b, and a fifth sub-rib 530c. That is, the following description is presented under the assumption that there are three battery units 100. However, the embodiments are not limited thereto. That is, the battery pack can include two, four or more battery units 100.

Referring to FIGS. 3 and 5, the first ribs 520 at least partially covers bottom portions of the neighboring first side surfaces 110A. For example, as shown in FIGS. 3 and 5, the first sub-rib 520a extends in the first direction so as to at least partially cover the bottom portions of the first side surfaces 110A of the neighboring first and second battery units 100a and 100b. Furthermore, the third sub-rib 520b extends in the first direction to at least partially cover the bottom portion of the first side surfaces 110A of both the neighboring second and third battery units 100b and 100c.

Referring to FIGS. 3 and 4, the second ribs 530 at least partially overlap the first ribs 520. For example, the second sub-rib 530a at least partially overlaps the first sub-rib 520a. At least portions of the fourth sub-rib 530b can overlap the first and third sub-ribs 520a and 520b. At least a portion of the fifth sub-rib 530c can overlap the third sub-rib 520b. In FIG. 4, reference text OL denotes overlapping regions.

The second ribs 530 respectively at least partially cover the neighboring second side surfaces 110B. For example, as shown in FIGS. 3 and 6, the second sub-rib 530a at least partially covers the second side surface 110B of the first battery unit 100a, the fourth sub-rib 530b at least partially covers the second side surface 110B of the second battery unit 100b, and the fifth sub-rib 530c at least partially covers the second side surface 110B of the third battery unit 100c. If the second ribs 530 respectively at least partially cover only the neighboring second side surfaces 110B, the first and second ribs 520 and 530 can be asymmetrically arranged with respect to a centerline axis ax of the bottom plate 510 defined in the first direction.

In other embodiments, like the first ribs 520, each of the second ribs 530 can extend in the first direction so as to at least partially cover the neighboring second side surfaces 110B. In this case, the first and second ribs 520 and 530 have substantially the same length and are substantially symmetrically arranged with respect to the centerline axis ax.

In another example, the first and second ribs 520 and 530 formed respectively at least partially cover the first and second side surfaces 110A and 110B of the neighboring battery units 100. In this case, however, the battery pack is vulnerable to torsion. That is, if the first rib 520 at least partially covers only the first side surfaces 110A and the second rib 530 at least partially covers only the second side surfaces 110B, the battery units 100 can be separated or broken away from the battery pack when the battery pack is twisted.

However, according to some embodiments, since each of the first ribs 520 at least partially covers the first sides 110A of the neighboring battery units 100, the battery units 100 are not separated or broken away by the twisting.

In addition, since at least portions of the second ribs 530 overlap the first ribs 520, the battery pack can be stably maintained in an assembled state even if a strong torsional force is applied to the battery pack.

The battery units 100 can be wrapped with a label (not shown). The label can be wrapped around and attached to sides of the battery units 100, ribs extending downward from the upper cover 400, and the first and second ribs 520 and 530 extending upward from the lower cover 500.

As described above, according to at least one of the disclosed embodiments, when an external force impacts the battery pack or the battery pack is twisted, the battery pack will maintain its structural integrity.

It should be understood that the exemplary embodiments described herein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details can be made therein without departing from the spirit and scope of the present invention as defined by the following claims.

What is claimed is:

1. A battery pack comprising:
    a plurality of battery units arranged in a first direction, each battery unit including first and second side surfaces opposing each other;
    a protective circuit module electrically connected to the battery units; and
    an upper cover and a lower cover respectively placed on upper sides and lower sides of the battery units,
    wherein the lower cover comprises:
    a bottom plate facing bottom surfaces of the battery units;
    a plurality of first ribs extending from the bottom plate toward the first side surfaces, wherein a first opening that exposes at least part of the first surfaces is formed between adjacent ones of the first ribs; and
    a plurality of second ribs extending from the bottom plate toward the second side surfaces, wherein a second opening that exposes at least part of the second surfaces is formed between adjacent ones of the second ribs,
    wherein each first rib extends in the first direction so as to at least partially cover the first side surfaces of neighboring battery units,
    wherein the first and second openings do not overlap each other in a second direction extending from the first side surfaces to the second side surfaces,
    wherein each battery unit further includes third and fourth side surfaces connected with the first and second side surfaces and having widths shorter than those of the first and second side surfaces, and
    wherein the battery units are arranged in the first direction such that the third and fourth side surfaces of adjacent ones of the battery units face each other.

2. The battery pack of claim 1, wherein each second rib overlaps at least a portion of at least one of the first ribs.

3. The battery pack of claim 1, wherein the first and second ribs are asymmetrically arranged with reference to a centerline axis of the bottom plate defined in the first direction.

4. The battery pack of claim 1, wherein the second ribs are placed so as to respectively correspond to the second side surfaces.

5. The battery pack of claim 4, wherein the second ribs at least partially cover only the respective second side surface.

6. The battery pack of claim 1, wherein each battery unit has a substantially prismatic shape.

7. The battery pack of claim 6, wherein each battery unit comprises:
    a can;
    an electrode assembly accommodated in the can and comprising a first electrode plate, a second electrode plate, and a separator placed therebetween;
    a cap plate sealing the electrode assembly in the can; and
    an electrode pin placed on the cap plate and having a polarity different from the polarity of the cap plate.

8. The battery pack of claim 1, wherein the protective circuit module is placed between the upper cover and the upper sides of the battery units.

9. The battery pack of claim 1, wherein the battery units are electrically connected in series, parallel, or series-parallel through a circuit pattern formed in the protective circuit module.

10. The battery pack of claim 1, wherein one of the first openings is greater than the length of at least one of the first ribs.

11. The battery pack of claim 1, wherein the battery units further include left and right most battery units respectively located in the leftmost and rightmost regions of the battery units, and wherein the third side surface of the leftmost battery unit and the fourth side surface of the rightmost battery unit are exposed to the environment.

* * * * *